United States Patent [19]  
Stayner

[11] 4,216,136  
[45] Aug. 5, 1980

[54] FIRE RETARDANT RESIN COMPOSITIONS AND ARTICLES FORMED THEREOF

[76] Inventor: Vance A. Stayner, P.O. Box 63, Sugar Grove, Ill. 60554

[21] Appl. No.: 915,825

[22] Filed: Jun. 16, 1978

[51] Int. Cl.² .............................................. C08L 67/00
[52] U.S. Cl. ............................... 260/40 R; 260/37 N; 260/37 EP; 260/42.52; 260/DIG. 24
[58] Field of Search ..... 260/45.7 ST, 40 R, DIG. 24, 260/37 N, 37 EP; 106/306; 252/8.1

[56] References Cited

U.S. PATENT DOCUMENTS

| 1,645,172 | 10/1927 | Winogradoff | 252/8.1 |
| 1,839,135 | 12/1931 | Vivas | 252/8.1 |
| 2,594,937 | 4/1952 | Lauring | 252/8.1 |
| 2,948,641 | 8/1960 | McCluer | 252/8.1 |
| 3,230,184 | 1/1966 | Alford | 260/40 R |
| 3,816,307 | 6/1974 | Woods | 252/8.1 |
| 3,875,106 | 4/1975 | Lazzaro | 260/DIG. 40 |
| 4,016,111 | 4/1977 | Wolff et al. | 260/DIG. 40 |
| 4,079,162 | 3/1978 | Metzger | 260/37EP |

Primary Examiner—Lewis T. Jacobs  
Attorney, Agent, or Firm—John L. Parker

[57] ABSTRACT

Reinforced synthetic resin compositions are provided having 25 to 90% by weight of synthetic resin, and the balance (75 to 10% by weight) of reinforcing fillers comprising: (1) 0 to 150 parts by weight of epsom salt, (2) 0 to 150 parts by weight of hydrated borax, and/or (3) 0 to 20 parts by weight of glass spheres, so long as at least one of the two components identified in (1) and (2) are used. The compositions may be used as coatings or for molded articles. They do not require use of aluminum trihydrate, or silica flour particles, or other known fillers having fire retardant properties. Yet, the compositions of the invention are found to possess heretofore unknown properties of fire retardancy, ablation, and smoke absorbency.

5 Claims, No Drawings

FIRE RETARDANT RESIN COMPOSITIONS AND ARTICLES FORMED THEREOF

DESCRIPTION OF THE INVENTION

This invention relates generally to resin compositions and articles formed thereof, and more particularly to such compositions and articles having improved fire resistance, ablative, and insulating qualities.

Various techniques have been employed in reinforcing polyester resins to form construction materials having desirable strength, impact resistance, and other properties necessary for a large variety of products such as boats, bathtubs, furniture and the like. Typically, a mold of the desired product shape is sprayed with a gel coat, polyester resin and reinforcing glass fibers are sprayed onto the coated mold to build up a thickness sufficient to provide structural integrity, the resin is cured, and finally the molded reinforced resin product is released from the mold. In other applications, the polyester resin and reinforcing glass fibers are sprayed onto sheets of synthetic resins.

One such process is that disclosed in Stayner U.S. Pat. No. 3,582,388, in which the resin composition includes glass fibers, glass beads and an inert organic solvent diluent for the resin. Another prior art process is exemplified by Brown U.S. Pat. No. 3,158,528 in which the resin composition includes glass flakes and mica particles. Still another process, disclosed in Canadian Pat. No. 893,163, concerns a resin composition incorporating mica platelets.

In conventional spraying systems, a spray gun such as the "Glas-Craft" gun is employed. Typically, the gun pumps resin through one orifice, pumps catalyst through another orifice, mixes them together and sprays the mixture out a nozzle and against a mold or plastic sheet. On top of the gun there is an air motor which drives a chopper, usually comprising a small rubber tire carrying razor type chopping blades. Glass fibers, in the form of continuous strand, are fed to the chopper, which cuts the strand into separate 1 to 2 inch long strings, which are then sprayed into the resin and thence onto the surface being coated.

There are several disadvantages to spraying glass fibers along with resin onto a mold, sheet or the like. One is that the short fiber strings do not lay flat on the coating surface. Instead, many of the fiber ends protrude above the coating surface, and it becomes necessary after application of the coating to roll the glass strings or "hairs" down so that they become completely encased and lay smooth in the resin coating. Another is that substantial labor costs are often involved just in handling the large quantities of resin and glass fibers needed to form the product.

One important development in the art has been the provision of reinforced resin compositions having the advantageous physical and application properties of glass fiber containing resins, but which compositions do not rely upon glass fibers alone. For example, Stayner et al. U.S. Pat. No. 3,920,603 and Stayner U.S. Pat. No. 4,028,134 disclose resinous compositions which can readily be applied to a mold, or to a vacuum or otherwise formed thermoplastic sheet, without use of glass fibers or a chopper gun, and without the need for time consuming and laborious rolling of a freshly applied resin surface to remove the "hairs". These compositions include (A) 10 to 60% by weight of synthetic resin, and
(B) Reinforcing fillers comprising:
   (1) 1 to 30% by weight of glass spheres,
   (2) 10 to 60% by weight of Suzorite mica platelets, and
   (3) 20 to 70% by weight of aluminum trihydrate particles.

As there described, it was found that such compositions, which contain 20 to 70% by weight of aluminum trihydrate particles, have properties of high fire retardancy and low smoke generation. Another Stayner patent, U.S. Pat. No. 4,087,401, discloses resinous compositions including (A) 10 to 60% by weight of synthetic resin, and
(B) Reinforcing fillers comprising:
   (1) 1 to 30% by weight of glass spheres,
   (2) 10 to 60% by weight of Suzorite mica platelets, and
   (3) 20 to 70% by weight of silica flour.

The silica flour content in such compositions is found to improve their fire retardancy, and increase their final surface hardness.

Other types of prior art applications include the spray coating of polyurethane foam materials with special resins to enhance fire protection of the coated materials. For example, it has been known to use coating resins filled with magnesium oxychloride or magnesium oxysulfide for this purpose. Unfortunately, only moderate fire protection is imparted by such prior compositions. Also, such compositions lack the ability to adhere to a substrate. For example, if a flame is applied to a ⅜ inch thick layer of such a coating on foam, the temperature of the non-coated back surface of the foam will reach 200 degrees F. within only 15 minutes or less, and the coating separates from the foam. If the same coating is applied to ½ inch thick plaster board, the back surface temperature of the plaster board will reach 250 degrees F. in the same time interval.

As advantageous as many of the prior art compositions are for many purposes, including fire retardancy generally, it has been found that they have severe limitations when expected to perform under extreme conditions of exposure to fire. As indicated, in applications where such compositions used to provide protective coatings on polyurethane or other foam materials are subjected to high flame temperatures, it is common for the coatings to fail after about 15 minutes.

It is a principal object of the present invention to provide improved resin compositions for coatings, and for forming articles thereof, which need not include either aluminum trihydrate or silica flour particles, and yet which have significantly improved fire retardancy and smoke absorbency properties. A related object is to provide improved resin compositions having far better fire resistance than prior compositions, and yet which are surprisingly light in weight. Still another object is to provide fire retardant resin compositions having improved stability and long shelf life prior to use.

It is also an object of the present invention to provide improved resin compositions incorporating fillers having ablative characteristics which render the filled compositions impervious to extreme conditions of heat for longer periods than heretofore.

Another object of the invention is to provide improved resin compositions incorporating filler materials which are nonreactive with the resin, and which remain in suspension therein during mixing of the fillers with the resin, without the addition of suspension agents, and thereafter, enhancing the shelf life of the filled compositions.

A further object of the invention is to provide lightweight resin compositions having improved weatherability characteristics, and which incorporate the use of relatively low cost ingredients. A related object is to provide low cost filler materials for use in relatively high cost resins, to thereby reduce the cost of the filled compositions while at the same time materially enhancing the fire retardant and related properties of the resins.

While the invention will be described in connection with certain preferred embodiments, it will be understood that I do not intend to limit the invention to those embodiments. On the contrary, I intend to cover all alternatives, modifications and equivalents as may be included within the spirit and scope of the invention.

In carrying out the invention, I have found that a special combination of filler materials—not including aluminum trihydrate or silica flour particles—added to the resin in particular ratios, imparts to the filled resinous composition greatly improved fire retardancy, ablative and smoke reduction properties. The improved resinous compositions of the invention, including the particular reinforcing filler materials and proportions employed, are as follows:

(A) 25 to 90% by weight of synthetic resin, and
(B) The balance (75 to 10% by weight) of reinforcing fillers comprising:
 (1) 0 to 150 parts by weight of "epsom salt",
 (2) 0 to 150 parts by weight of "hydrated borax", and/or
 (3) 0 to 20 parts by weight of glass spheres,
so long as at least one of the two components identified in (B)(1) and (B)(2) are used.

Of course, it is to be understood that various other well known filler materials may be added in minor amounts to the above described compositions. For example, those skilled in the art may wish to add aluminum trihydrate particles, silica flour, mica platelets, calcium carbonate particles, glass fibers, glass flakes, clays or talc.

Those skilled in the art will be able to select particular compositions from the ranges set forth above for particular end uses. That is, depending upon what properties are desired in the final product, the quantities of filler ingredients and the quantity of resin may be selected as desired. Likewise, the particular fillers to be used and their proportions may be selected as needed.

Any of various general purpose curable synthetic thermosetting resins may be used in carrying out the invention. For example, such resins include polyester resins, epoxy resins, vinyl esters, and polyurethanes (both rigid and flexible, foamed and not foamed). I prefer to employ rigid, thixotropic resins which are curable at room temperatures and become rigid after curing. Particularly useful are low viscosity resins of this type which permit high filling concentrations, and which contain a compatible solvent which will render thermoplastic materials, such as acrylic sheets, acceptable to a molecular bond with the resin, so that the resin will readily adhere to the thermoplastic material.

For example, I have successfully used the styrene modified polyester resins marketed by Reichhold Chemicals, Inc. known as 94-169, 94-176 and 33-082, a vinyl ester 901-S marketed by the Hooker Chemical Company division of Ashland Oil Company, and two-component polyurethane foam systems supplied by Freeman Chemical Company (31-1947 and 31-2013). The 94-176 and 33-082 resins both possess superior bonding properties when used to coat an acrylic sheet, and the latter resin may also be used in conventional lay up applications using a gelcoat mold. Combinations of resins may be employed, if desired, to achieve optimum combinations of the characteristics of each resin.

Magnesium sulfate heptahydrate, commonly called "epsom salt", occurs in nature or may be synthesized through the action of sulfuric acid on magnesium hydroxide. I prefer to employ technical grade epsom salt, which comprises small, glistening, opaque needle shaped crystals with the following typical specifications (all percentages by weight):

| | |
|---|---|
| $MgSO_4$ | 48.3% minimum |
| $MgSO_4$ (as $MgSO_4 \cdot 7H_2O$) | 99.0% minimum |
| MgO | 0.10% maximum |
| Chlorides (as Cl) | 0.03% maximum |
| Bulk Density | 65. lbs/ft.$^3$ |
| Specific Gravity | 1.68 |
| Melting Point ($-6H_2O$) | 150 degrees F. |
| Water of Crystallization ($H_2O$) | about 51.% |

As will be explained below, I take advantage of the presence of the seven molecules of hydrated water in the magnesium sulfate in carrying out my invention.

The "hydrated borax" that I use is sodium tetraborate decahydrate, $Na_2B_4O_7 \cdot 10H_2O$. I prefer to employ technical grade hydrated borax, which comprises small, opaque prism shaped crystals with the following typical specifications (all percentages by weight):

| | |
|---|---|
| Sodium Oxide ($Na_2O$) | 16.25% |
| Boric Oxide ($B_2O_3$) | 36.51% |
| Water of Crystallization ($H_2O$) | 47.24% |
| Anhydrous Borax ($Na_2B_4O_7$) | 52.76% |
| Specific Gravity | 1.73 |
| Melting Point | 144 degrees F. |
| Particle Size | $-8$ to $+100$ sieve |

As will be explained, the presence of the ten molecules of hydrated water in the borax is utilized in carrying out the invention.

The glass spheres that I use may be hollow or solid, and typically are microscopically sized, ranging from 6 to 80 microns average diameter. Various types may be employed, including soda-lime glasses, borosilicate glasses, and fly ash. I prefer to use a sodium borosilicate type microsphere marketed by PQ Corporation, Valley Forge, Pa. as "Q-Cel". Its typical characteristics are (all percentages by weight):

| | |
|---|---|
| Silica ($SiO_2$) | 50.% |
| Sodium Oxide ($Na_2O$) | 25.% |
| Boric Oxide ($B_2O_3$) | 14.5% |
| Anti-caking agent | 5.5% |
| Water | 5.% |
| Average Particle Size | 65–75 microns |
| Particle Size Range | 10–200 microns |
| Particle Size Distribution | |
| $+80$ | 1–2% |
| $-80/+100$ | 2–3% |
| $-325$ | 25–35% |
| specific Gravity | 0.18–0.21 |
| Wall Thickness | 1–2 microns |
| Melting Point | 1100 degrees F. |

Q-Cels are preferred mainly because of their boric oxide content (for smoke absorbency), their specific gravity which is slightly greater than that of many other glass spheres, and the fact that the microspheres are virtually devoid of interior gases.

Other glass spheres having generally similar properties include "Armospheres", fly ash type glass spheres marketed by P.A. Industries, Lookout Mountain, Tenn., and soda-lime type glass beads manufactured by 3M Corporation, St. Paul, Minn.

In accordance with my invention, I carefully select my filler ingredients in such manner as to take full advantage of their physical shapes and particle sizes. Thus, the epsom salt rod-shaped crystals function as relatively coarse ingredients of the filler mix. The hydrated borax prisms interfit in ramdom directions with the rods, and the microspheres act to keep the rods and prisms in suspension in the resin and improve packing.

In some instances, e.g. where the final composition includes glass fibers, it may be desirable to use epsom salt rods or borax prisms having a low aspect ratio, i.e. length to thickness ratio. In such cases, use of such an aspect ratio, of from about 10 to 1 or less, wets out the glass fibers more readily. In other situations, such as a coating which does not include glass fibers, the aspect ratio of the epsom salts or borax prisms is preferably higher (e.g. above about 10 to 1) so that stresses will be transmitted along the length of the rods thereby increasing the tensile strength of the resulting reinforced resin composition.

The glass microspheres function as ball bearings while the compositions are being mixed, facilitating even distribution and packing of fillers throughout the compositions. An important role of the glass spheres in the composition is to provide buoyancy during mixing of the composition ingredients, to thereby bring about even stress distribution and greater resulting impact strength of the final composition. The glass spheres also lower the density of the overall composite, and increase its volume. The spheres may also significantly enhance the insulating qualities of the composition, thereby retarding the rate of release of the hydrated water from the hydrated borax and/or epsom salt. Where "Q-Cel" is used, and the resulting composition is subjected to fire conditions, the borosilicate glass tends to pick up impurities, forming a black layer on the surface which layer itself tends to prevent smoke generation.

In some applications, it is desirable to create compositions having negative buoyancy. For example, it may be desirable for a boat hull to have negative buoyancy so that it will float even though punctured. In other applications, exteme light weight is important such as for air freight shipment containers. In such instances, the compositions of the invention may be tailor-made for the application by increasing the proportion of microspheres.

My filler ingredients are also carefully selected and proportioned to take advantage of their water contents. Thus, the ten molecules of hydrated water carried by the hydrated borax prisms are available to be released to retard flame propagation and smoke generation. Importantly, the ten molecules of water make up 47.24% or substantially one-half of the total weight of the compound, thus making available relatively large quantities of water for ablation. Initial release of this water begins at about 144 degrees F. In addition, the $B_2O_3$ absorbs smoke. The epsom salt rods include seven molecules of hydrated water, which make up about 51% of the total weight of the compound. This water begins to be released at about 150 degrees F. Even though the hydrated borax and the epsom salt are completely soluble in water, neither will dissolve in the resin.

The following illustrative compositions were prepared by mixing the filler ingredients together in a dry blend, and then adding each blend to the resin. A small amount, 1 to 2 percent by weight of a 60 percent methyl ethyl ketone peroxide solution in dimethyl phthalate was added to each resin as a curing agent or hardener. After a few minutes at room temperature, each filled resin was ready for use. Room temperature curing is preferred, since curing at elevated temperatures might tend to prematurely drive off the water of crystallization from the epsom salt or hydrated borax.

The illustrative compositions were as follows:

| | Examples of Resinous Compositions Percentages by Weight | | | | | | | | | | | |
|---|---|---|---|---|---|---|---|---|---|---|---|---|
| | A | B | C | D | E | F | G | H | I | J | K | L |
| RESIN | 25. | 40. | 40. | 40. | 40. | 40. | 43. | 50. | 50. | 60. | 65. | 90. |
| EPSOM SALT | 37.5 | 40. | 20. | — | 60. | 25. | 35.5 | 37.5 | — | — | 20. | 3. |
| HYDRATED BORAX | 37.5 | 20. | 40. | 60. | — | 25. | 18. | — | 37.5 | 20. | — | 2. |
| GLASS SPHERES | — | — | — | — | — | 10. | 3.5 | 12.5 | 12.5 | 20. | 15. | 5. |

Compositions A, B, C, D and E were relatively heavy, i.e. had negative buoyancy, and had a high degree of ablation and mechanical strength. Compositions B and C had somewhat lower viscosity than Composition A, and Composition D and E could readily be used in conjunction with other fillers, for example, with glass fibers.

Composition F was a readily workable, low density composite which floated. Composition G was particularly suited for spray gun applications over foams; its filler composite had approximately the same specific gravity as the resin. Compositions H and I were lighter than Composition F and were trowelable, and could be used with additional fillers.

Compositions J and K were the lightest weight, trowelable compositions. Composition L had a low filler content which could be used with fire retardant type resins, or in instances where only minimal fire protection would be necessary.

Advantageously, as in Composition G, the proportions of the fillers are adjusted so that their composite specific gravity generally approximates that of the resin (in this instance, about 1.13 S.G.). This helps prevent settling out of the fillers after mixing with the resin. At the same time, the volume of the fillers more than doubles that of the resin, thereby interposing the fire retardant filler particles at frequent intervals throughout the resin.

When articles formed of the compositions of the invention are subjected to extreme fire conditions, it is believed that the following takes place at the marginal exposed surface of the articles. First, the hydrated borax tends to release its water of hydration. This water of hydration is then picked up by the hygroscopic epsom salt, and a compound or compounds (whitish in color) start to form between the hydrated borax and the epsom salt. More water of hydration is released than the resin can tolerate. When the surface temperature reaches about 200 degrees F., small popcorn-like bubbles appear at the surface in the presence of a flame. These bubbles are believed to result from expansion of the crystals as they give off their water of crystallization. The ablated water functions to reduce or eliminate smoke formation; also, the temperature of the surface usually will not exceed about 210 degrees F. during ablation. Continued exposure of the surface to flame will cause some charring to take place after the water is driven off, but an isinglass type fused material is believed to form which may itself help reduce flame propagation and smoke generation.

Filled resin compositions made according to the invention were applied to pieces of paper, in layers approximately ⅛ inch thick. Polyester resins were used with resin to filler ratios, and filler components and quantities being the same as Compositions A, B, C, F and G above. A propane torch flame (½ inch long, blue cone) was applied to each resin coating so that the tip of the flame cone touched the surface of the coating. In each instance, after 20 minutes had elapsed, the temperature of the backside of the paper still did not exceed 210 degrees F. above ambient temperature. A similar test was carried out using Compositions A, B and G in layers approximately 3/16 inch thick. After 60 minutes the temperature of the backsides of the papers in each instance had not exceeded 250 degrees F. above ambient temperature. Conventional coatings under the same circumstances were found to produce backside temperatures exceeding 250 degrees F. over ambient after only 10 to 15 minutes.

A standardized tunnel test in common use to test flame spread and smoke generation characteristics of fire retardant materials is known as ASTM Test C-739 (small tunnel). In carrying out this test, it is common practice to assign limit values to known standard materials, such as asbestos and red oak, and then to measure materials to be tested against these standards. For example, virtually no known resins, by themselves, produce smoke contribution readings less than that of asbestos or red oak.

The resin compositions of the invention were tested in comparison with conventional compositions in C-739 small tunnel tests as follows.

Composition 1 was a sample of ordinary polyester resin (Reichhold 94-231) alone, i.e. without any fillers or additives. Composition 2 was a special fire retardant commercial polyester resin (Reichhold 33-441) incorporating the filler materials described in my prior U.S. Pat. No. 4,028,134. Composition 3 was an ordinary polyester resin (Reichhold 94-231) incorporating the filler materials described herein (see Composition G above). All three compositions were applied in ⅛ inch thick coatings to transite strips. Both asbestos and red oak samples were used as standards. The results of the test were as follows.

After 5 minutes time, the extent of the flame spread on the asbestos was 4.8 inches. This, then, was given a zero value. There was no smoke generation from the asbestos, and it was likewise given a zero smoke value. After 3 minutes time, the extent of flame spread along the red oak sample was 9.2 inches. Subtracting the 4.8 inches asbestos standard from the 9.2 inches, leaves 4.4 inches of red oak flame spread over 3 minutes time. Using this red oak material as a standard, this means that the extent of flame spread was approximately 1.5 inches per minute.

Test Composition 1 exhibited a flame spread of 19 inches (the entire length of the test tunnel) in only 2.5 minutes time. In other words, this composition failed utterly. Composition 2 exhibited a flame spread of 9 inches in 1 minute time.

Composition 3, a composition of the invention, showed only 6 inches flame spread after 5 minutes time. The composition of the invention thus clearly gave the best performance of any of the test samples. In addition, insofar as smoke generation is concerned, Composition 3 exhibited less smoke than the red oak. By contrast, Composition 1 generated 16 times as much smoke as red oak, and Composition 2 generated 6 times as much smoke as red oak.

The resinous compositions of the invention may be used for coating paper, corrugated board, wood, plastics, metals, or any other materials that are subject to combustion or softening under fire conditions. They may also be used to render cellular products non-combustible. For example, the filler materials of the invention may be introduced directly into an isocyanate type foam by mixing equal parts by weight of the filler materials with equal parts by weight of each of the two standard foam components. The entire foam product is found to possess the excellent ablative properties described in connection with the invention herein.

As indicated, polyester resins by themselves are readily combustible, so that they have only limited usefulness when used in applications where fire protection is required. Importantly, fillers selected for use with such resins should not only have the desired ablative properties, but must be insoluble in the resin. The compositions utilized in carrying out my invention possess such a combination of desirable characteristics. Using my invention, it is now possible to render non-burning virtually any thermosetting resin, by incorporating in the resin the novel ablative filler combinations disclosed herein. My compositions find many uses as flame retardants and arc resistant fillers in various resins and plastics.

I claim as my invention:

1. A composition comprising about 25 to 90 percent by weight of a curable, synthetic resin, and about 75 to 10 percent by weight of a mixture of at least two of the following reinforcing fillers:
   (1) up to 150 parts by weight of epsom salt,
   (2) up to 150 parts by weight of hydrated borax,
   (3) up to 20 parts by weight of glass spheres.

2. The composition of claim 1 in which the resin comprises about 40 percent by weight, and the filler mixture comprises about 60 percent by weight.

3. The composition of claim 2 in which the filler mixture comprises about 100 parts by weight epsom salt, about 50 parts by weight hydrated borax, and about 10 parts by weight glass spheres.

4. For use as a reinforcing filler in a curable, synthetic resin, a dry blend including 1 to 20 parts by weight of glass spheres, and at least one of the following reinforcing fillers:
   (1) up to 150 parts by weight of epsom salt,
   (2) up to 150 parts by weight of hydrated borax.

5. The composition of claim 4 in which the filler mixture comprises about 100 parts by weight epsom salt, about 50 parts by weight hydrated borax, and about 10 parts by weight glass spheres.

* * * * *